US011948527B2

(12) United States Patent
Kim et al.

(10) Patent No.: US 11,948,527 B2
(45) Date of Patent: Apr. 2, 2024

(54) LIQUID CRYSTAL DISPLAY PANEL AND DISPLAY DEVICE

(71) Applicant: TCL CHINA STAR OPTOELECTRONICS TECHNOLOGY CO., LTD., Guangdong (CN)

(72) Inventors: Kyunho Kim, Guangdong (CN); Youngil Ban, Guangdong (CN); Anle Hu, Guangdong (CN); Jianjian Ying, Guangdong (CN); Yingying Liu, Guangdong (CN)

(73) Assignee: TCL CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 17/622,786

(22) PCT Filed: Dec. 17, 2021

(86) PCT No.: PCT/CN2021/139371
§ 371 (c)(1),
(2) Date: Dec. 24, 2021

(87) PCT Pub. No.: WO2023/103062
PCT Pub. Date: Jun. 15, 2023

(65) Prior Publication Data
US 2024/0038191 A1 Feb. 1, 2024

(30) Foreign Application Priority Data
Dec. 9, 2021 (CN) ......................... 202111496563.0

(51) Int. Cl.
*G09G 3/36* (2006.01)

(52) U.S. Cl.
CPC ......... *G09G 3/3614* (2013.01); *G09G 3/3677* (2013.01); *G09G 3/3688* (2013.01); *G09G 2300/0823* (2013.01)

(58) Field of Classification Search
CPC ......... G09G 2300/0842; G09G 3/3648; G09G 2310/08
See application file for complete search history.

(56) References Cited

U.S. PATENT DOCUMENTS 8,854,353 B2 * 10/2014 Chung ................. G09G 3/3266 345/212
8,866,859 B2 * 10/2014 Chung ................. G09G 3/3266 345/82
(Continued)

FOREIGN PATENT DOCUMENTS

CN 104808406 A 7/2015
CN 105096899 A 11/2015
(Continued)

OTHER PUBLICATIONS

International Search Report in International application No. PCT/CN2021/139371, dated Jun. 28, 2022.
(Continued)

*Primary Examiner* — Van N Chow
(74) *Attorney, Agent, or Firm* — PV IP PC; Wei Te Chung; Zhigang Ma

(57) ABSTRACT

The application discloses a liquid crystal display panel and a display device. In the liquid crystal display panel, each pixel unit includes a first sub-pixel and a second sub-pixel. The polarities of the data voltages received by two adjacent pixel units sharing the same data line are opposite. In each pixel unit, the driving timing of the first sub-pixel is earlier than the driving timing of the second sub-pixel, and the duty cycle of the scan signal received by the first sub-pixel is
(Continued)

greater than the duty cycle of the scan signal received by the second sub-pixel.

20 Claims, 3 Drawing Sheets

(56) References Cited

U.S. PATENT DOCUMENTS

| | | | | |
|---|---|---|---|---|
| 9,123,310 | B2 * | 9/2015 | Choi | G09G 3/3696 |
| 2011/0205260 | A1 * | 8/2011 | Weng | G09G 3/3648<br>345/691 |
| 2011/0261028 | A1 | 10/2011 | Goh et al. | |
| 2012/0013588 | A1 * | 1/2012 | Chung | G09G 3/3266<br>345/204 |
| 2018/0174531 | A1 * | 6/2018 | Chen | G09G 3/36 |
| 2020/0118511 | A1 | 4/2020 | Chen | |
| 2021/0398482 | A1 * | 12/2021 | Wang | G09G 3/3233 |

FOREIGN PATENT DOCUMENTS

| | | | |
|---|---|---|---|
| CN | 105511184 | A | 4/2016 |
| CN | 106601209 | A | 4/2017 |
| CN | 109830203 | A | 5/2019 |
| CN | 110208995 | A | 9/2019 |
| CN | 110233172 | A | 9/2019 |
| CN | 112540487 | A | 3/2021 |
| CN | 113362762 | A | 9/2021 |

OTHER PUBLICATIONS

Written Opinion of the International Search Authority in International application No. PCT/CN2021/139371, dated Jun. 28, 2022.

Chinese Office Action issued in corresponding Chinese Patent Application No. 202111496563.0 dated Jun. 27, 2022, pp. 1-8.

* cited by examiner

LIQUID CRYSTAL DISPLAY PANEL AND DISPLAY DEVICE

FIELD OF THE DISCLOSURE

This present disclosure relates to the field of display technology, in particular to a liquid crystal display panel and a display device.

BACKGROUND

With the advance of science and technology, display panel has been widely adopted in a variety of fields. In particular, liquid crystal display (LCD) panels have been applied in various electronic products in view of their superior characteristics, including thin body, low power consumption, and no radiation.

With the enhancement of resolution and resolution in LCD panels, number of data lines increases proportionately. Accordingly, number of source driver chips providing data signals increases exponentially, which results in rising production costs. In this regard, a data line sharing (DLS) driving scheme is usually adopted to reduce the number of data lines. Moreover, due to the characteristics of the liquid crystal molecules of LCD panels, they cannot be provided with a fixed voltage for a long time. Otherwise, their properties will be destroyed, and even if the voltage is removed, the liquid crystal molecules will no longer rotate to form various gray levels in respond to changes of electric fields. It is therefore necessary to drive the liquid crystal by applying voltages with different polarities. Currently, there are four common types of LCD polarity array, including frame inversion, column inversion, row Inversion, and dot inversion.

In case the DLS driving scheme is combined with a 2-dot inversion in a liquid crystal display panel, the charging rates of the sub-pixels connected to the same data line tend to be different. This will result in a difference in brightness, which leads to the problem of unexpected stripes showing on the display screen.

SUMMARY

The present disclosure provides a liquid crystal display panel and a display device to solve the technical problem of different charging rates of sub-pixels connected to the same data line when the DLS driving scheme is combined with a 2-dot inversion.

The present disclosure provides a liquid crystal display panel. The liquid crystal display panel includes a plurality of scan lines arranged along a first direction, a plurality of data lines, arranged along a second direction, and a plurality of pixel units. The scan lines are configured to transmit scan signals. The adjacent data lines are configured to transmit data voltages with different polarities. The plurality of pixel units are arranged in an array. Each of the pixel units includes a first sub-pixel and a second sub-pixel, and the first sub-pixel and the second sub-pixel sharing the same data line are electrically connected to two adjacent scan lines respectively.

In the first direction, the polarities of the data voltages received by the two adjacent pixel units sharing the same data line are opposite. In each of the pixel units, the driving timing of the first sub-pixel is earlier than the driving timing of the second sub-pixel, and the duty cycle of the scan signal received by the first sub-pixel is greater than the duty cycle of the scan signal received by the second sub-pixel.

The embodiment of the present disclosure can reduce the difference in the charging rates of the first sub-pixel and the second sub-pixel, avoid various stripes caused by the difference in brightness, and thereby improve the display quality of the liquid crystal display panel.

Optionally, in some embodiments of the present disclosure, the duty cycle of the scan signal is adjusted based on the voltage difference between the data voltage received by the corresponding first sub-pixel and the previous data voltage transmitted by the corresponding data line.

According to the embodiment of the present disclosure, the duty cycle of the scan signal can be adjusted according to the change in the voltage value of the data voltage transmitted by the data line, so as to effectively reduce the difference of charging rates between the first sub-pixel and the second sub-pixel.

Optionally, in some embodiments of this application, the ratios of the duty cycle of the scan signal received by the first sub-pixel to the duty cycle of the scan signal received by the second sub-pixel in a plurality of pixel units are the same.

In the embodiment of the present disclosure, by setting the duty cycle of the scan signal received by the first sub-pixel and the duty cycle of the scan signal received by the second sub-pixel to a fixed value, it improves the charging rates of the first sub-pixel and the second sub-pixel, while at the same time reduces the complexity of the driving timing.

Optionally, in some embodiments of the present disclosure, the data line is further configured to transmit a common voltage to each of the first sub-pixels before transmitting the data voltage to each of the first sub-pixels.

In the embodiment of the present disclosure, by transmitting a common voltage to each of the first sub-pixels is equivalent to pre-charging the first sub-pixels, which can further improve the charging rates of the first sub-pixels.

Optionally, in some embodiments of the present disclosure, in each row of the pixel units, the polarities of the data voltages connected to the adjacent pixel units are opposite, and the polarities of the data voltages connected to the plurality of the pixel units located in the same column are the same.

In the embodiment of the present disclosure, the connection manner of the first sub-pixel and the second sub-pixel to the scan line and the data line is relatively flexible.

Optionally, in some embodiments of the present disclosure, two scan lines are provided between two adjacent rows of pixel units. In each pixel unit, the first sub-pixel is located in the first column, the second sub-pixel is located in the second column, the first sub-pixel is electrically connected to the scan line located above the pixel unit, and the second sub-pixel is electrically connected to the scan line located below the pixel unit.

In the embodiment of the present disclosure, the positions of the first sub-pixel and the second sub-pixel are confined so that the first sub-pixel and the second sub-pixel are connected to the scan line and the data line more regularly.

Optionally, in some embodiments of the present disclosure. For the two adjacent rows of the pixel units, in one row of the pixel units, the first sub-pixel and the second sub-pixel are both electrically connected to the data line located on the left side and adjacent to the pixel unit, and in the other row of the pixel unit, the first sub-pixel and the second sub-pixel are both electrically connected to the data line located on the right side and adjacent to the pixel unit.

Optionally, in some embodiments of the present disclosure, in each row of the pixel units, the polarities of the data voltages connected to the adjacent pixel units are opposite.

In each column of the pixel units, the polarities of the data voltages connected to the adjacent pixel units are opposite.

In the embodiment of the present disclosure. Along the second direction, the liquid crystal display panel adopts a 2-dot inversion driving method. Along the first direction, a 1-dot inversion driving method can be used to further improve the quality of the display picture.

Optionally, in some embodiments of the present disclosure, the first sub-pixel and the second sub-pixel are red sub-pixels, green sub-pixels, or blue sub-pixels. In the pixel units of the same row, the red sub-pixels, the green sub-pixels, and the blue sub-pixels are repeatedly arranged in any permutation and combination, and the colors of the first sub-pixels or the second sub-pixels located in the same column are the same.

In the embodiment of the present disclosure, the RGB pixel arrangement structure has a simple structure and a mature production process. The application in the present disclosure can simplify the production process and reduce the production cost.

Optionally, in some embodiments of the present disclosure, the first sub-pixel and the second sub-pixel are red sub-pixels, green sub-pixels, blue sub-pixels, or white sub-pixels. In the pixel units of the same row, the red sub-pixels, the green sub-pixels, the blue sub-pixels, and the white sub-pixels are repeatedly arranged in any permutation and combination, and the colors of the first sub-pixel or the second sub-pixel located in the same column are the same.

In the embodiment of the present disclosure, white sub-pixels are added to the RGBW pixel arrangement structure, so that the light transmittance of the liquid crystal display panel 100 is significantly improved.

The present disclosure also provides a display device, the display device includes a liquid crystal display panel, a source drive chip and a gate drive circuit. The source drive chip is used to provide data voltages to the liquid crystal display panel. The gate driving circuit is used to provide scan signals to the liquid crystal display panel. The liquid crystal display panel includes a plurality of scan lines arranged along a first direction, a plurality of data lines, arranged along a second direction, and a plurality of pixel units. The scan lines are configured to transmit scan signals. The adjacent data lines are configured to transmit data voltages with different polarities. The plurality of pixel units are arranged in an array. Each of the pixel units includes a first sub-pixel and a second sub-pixel, and the first sub-pixel and the second sub-pixel sharing the same data line are electrically connected to two adjacent scan lines respectively.

In the first direction, the polarities of the data voltages received by the two adjacent pixel units sharing the same data line are opposite. In each of the pixel units, the driving timing of the first sub-pixel is earlier than the driving timing of the second sub-pixel, and the duty cycle of the scan signal received by the first sub-pixel is greater than the duty cycle of the scan signal received by the second sub-pixel.

Optionally, in some embodiments of the present disclosure, the duty cycle of the scan signal is adjusted based on the voltage difference between the data voltage received by the corresponding first sub-pixel and the previous data voltage transmitted by the corresponding data line.

Optionally, in some embodiments of the present disclosure, in a plurality of rows of the pixel units, the ratios of the duty cycle of the scan signal received by the first sub-pixel to the duty cycle of the scan signal received by the second sub-pixel are the same.

Optionally, in some embodiments of the present disclosure, the data line is further configured to transmit a common voltage to each of the first sub-pixels before transmitting the data voltage to each of the first sub-pixels.

Optionally, in some embodiments of the present disclosure, in each row of the pixel units, the polarities of the data voltages connected to the adjacent pixel units are opposite, and the polarities of data voltages connected to the plurality of pixel units located in the same column are the same.

Optionally, in some embodiments of the present disclosure, two scan lines are provided between two adjacent rows of pixel units. In each pixel unit, the first sub-pixel is located in the first column and the second sub-pixel is located in the second column, the first sub-pixel is electrically connected to the scan line located above the pixel unit and the second sub-pixel is electrically connected to the scan line located below the pixel unit.

Optionally, in some embodiments of the present disclosure. For the two adjacent rows of the pixel units, in one row of the pixel units, the first sub-pixel and the second sub-pixel are both electrically connected to the data line located on the left side and adjacent to the pixel unit, and in the other row of the pixel units, the first sub-pixel and the second sub-pixel are both electrically connected to the data line located on the right side and adjacent to the pixel unit.

Optionally, in some embodiments of the present disclosure, in each row of the pixel units, the polarity of the data voltages connected to the adjacent pixel units are opposite. In each column of the pixel units, the polarities of the data voltages connected to the adjacent pixel units are opposite.

Optionally, in some embodiments of the present disclosure, the first sub-pixel and the second sub-pixel are red sub-pixels, green sub-pixels, or blue sub-pixels. In the pixel units of the same row, the red sub-pixels, the green sub-pixels, and the blue sub-pixels are repeatedly arranged in any permutations and combinations, and the colors of the first sub-pixels or the second sub-pixels located in the same column are the same.

Optionally, in some embodiments of the present disclosure, the first sub-pixel and the second sub-pixel are red sub-pixels, green sub-pixels, blue sub-pixels, or white sub-pixels. In the pixel units of the same row, the red sub-pixels, the green sub-pixels, the blue sub-pixels, and the white sub-pixels are repeatedly arranged in any permutations and combinations, and the colors of the first sub-pixel or the second sub-pixel located in the same column are the same.

The application provides a liquid crystal display panel and a display device. The liquid crystal display panel includes multiple scan lines, multiple data lines, and multiple pixel units. The scan line is configured to transmit a scan signal. Adjacent data lines are configured to transmit data voltages with different polarities. Each pixel unit includes a first sub-pixel and a second sub-pixel, the first sub-pixel and the second sub-pixel sharing the same data line are electrically connected to two adjacent scan lines. The data voltages received by two adjacent pixel units sharing the same data line have opposite polarities. In each pixel unit, the driving timing of the first sub-pixel is earlier than the driving timing of the second sub-pixel. In the present disclosure, by setting the duty cycle of the scan signal received by the first sub-pixel to be greater than the duty cycle of the scan signal received by the second sub-pixel, the difference of the charging rates between the first sub-pixel and the second sub-pixel can be reduced, and various stripes generated by the difference in brightness can be avoided, thereby improving the display quality. In addition, the present disclosure can further improve the charging rate of the first sub-pixel by transmitting a common voltage to the first sub-pixel before transmitting the data voltage to the first sub-pixel.

BRIEF DESCRIPTION OF THE DRAWINGS

In order to explain the technical solutions in the embodiments of the present disclosure more clearly, drawings referenced in the description of the embodiments are briefly introduced in the following. Obviously, the drawings in the following descriptions are only for some embodiments of the present disclosure. For those skilled in the art without creative work, other drawings can be derived based on these drawings.

DETAILED DESCRIPTION

The technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments. Based on the embodiments in this application, other embodiments derived by those skilled in the art without creative work shall fall within the protection scope of this application.

In the description of this application, it should be understood that the terms "first" and "second" are only used for descriptive purposes, they cannot be understood as indicating or implying relative importance or implicitly indicating the number of indicated technical features. Therefore, the features defined as "first" and "second" may explicitly or implicitly include one or more of the features, and therefore cannot be understood as a limitation of the present disclosure.

The present disclosure provides a liquid crystal display panel and a display device, which will be described in detail below. It should be noted that the description order of the following embodiments is not intended to limit the preferred order of the embodiments of the present disclosure.

Figure 1:
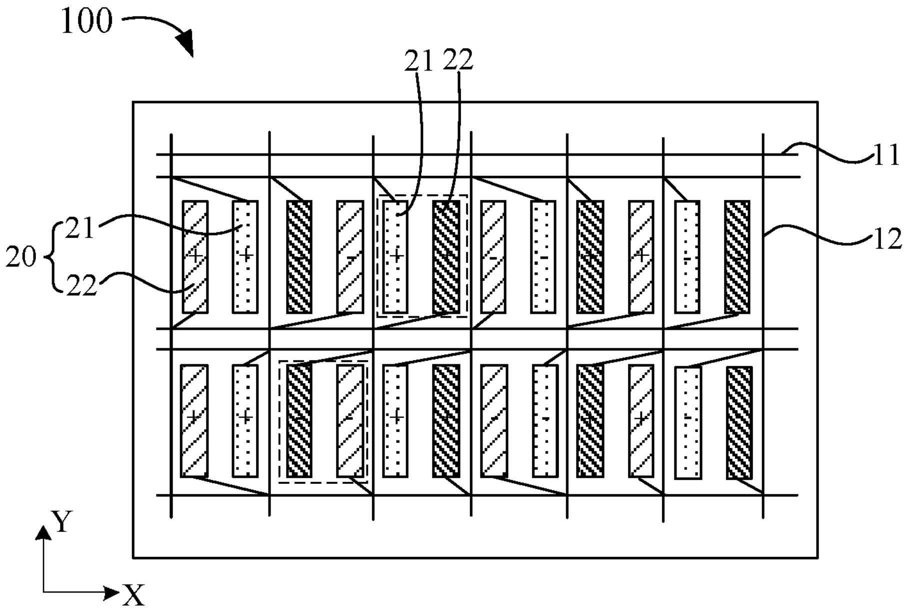
FIG. 1 is a schematic diagram of a first structure of a liquid crystal display panel provided by the present disclosure.

Please refer to FIG. 1. FIG. 1 is a first structural diagram of the liquid crystal display panel provided by the present disclosure. In this application, the liquid crystal display panel 100 includes a plurality of scan lines 11, a plurality of data lines 12 and a plurality of pixel units 20.

Specifically, each scan line 11 extends along the second direction X. A plurality of scan lines 11 are arranged along the first direction Y. The scan line 11 is configured to transmit a scan signal. Each data line 12 extends along the first direction Y. The multiple data lines 12 are arranged along the second direction X. The adjacent data lines 12 are configured to transmit data voltages having opposite polarities. The plurality of pixel units 20 are arranged in an array, and each pixel unit 20 includes a first sub-pixel 21 and a second sub-pixel 22. The first sub-pixel 21 and the second sub-pixel 22 sharing the same data line 12 are electrically connected to two adjacent scan lines 11 respectively. Along the first direction Y, the polarities of the data voltages received by two adjacent pixel units 20 sharing the same data line 12 are opposite. In each pixel unit 20, the driving timing of the first sub-pixel 21 is earlier than the driving timing of the second sub-pixel 22, and the duty cycle of the scan signal received by the first sub-pixel 21 is greater than the duty cycle of the scan signal received by the second sub-pixel 22.

Among them, the duty cycle refers to the ratio of the turn-on time to the total time in a pulse cycle. It can also be understood as the percentage of the on-duration of the scan line 11 in the entire horizontal period in 1H (H represents the horizontal period).

Wherein, the first direction Y and the second direction X may intersect vertically or may only intersect but not vertically. The drawings are only examples and should not be construed as limiting the application.

Wherein, the material of the scan line 11 and the data line 12 can be any one of silver (Ag), aluminum (Al), nickel (Ni), chromium (Cr), molybdenum (Mo), copper (Cu), tungsten (W) or titanium (Ti). The above-mentioned metals have good conductivity and low cost, which can reduce the production cost while ensuring the conductivity of the scan line 11 and the data line 12. The material of the scan line 11 and the data line 12 can also be a transparent material with low resistivity such as carbon nanotubes or graphene, so as to reduce the impact of opening ratio of the scan line 11 and the data line 12 to the first sub-pixel 21 and the second sub-pixel 22.

The number of scan lines 11 and data lines 12 can be set according to the size of the liquid crystal display panel 100 and the specified resolution of the liquid crystal display panel 100, which is not specifically limited in this application.

Among them, the first sub-pixel 21 and the second sub-pixel 22 share the same data line 12, that is, the DLS driving method is adopted to reduce the number of data lines 12, thereby reducing the required number of source driver chips as well as reducing production costs.

Since the scan line 11 is turned on row by row, in each pixel unit 20, the sub-pixel electrically connected to the scan line 11 that is turned on first is the first sub-pixel 21, and the sub-pixel electrically connected to the scan line 11 that is turned on later is the second sub-pixel 22. The specific connection relationship will be described in the following embodiments and will not be repeated here.

Figure 2:
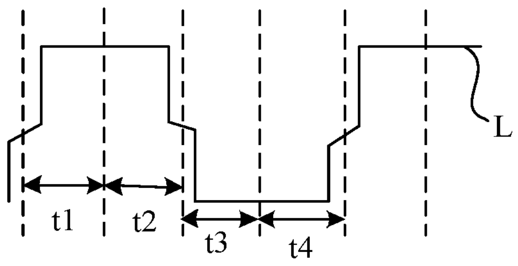
FIG. 2 is a first signal timing diagram when two adjacent pixel units sharing the same data line in the liquid crystal display panel provided by present disclosure are charged.
Figure 3:
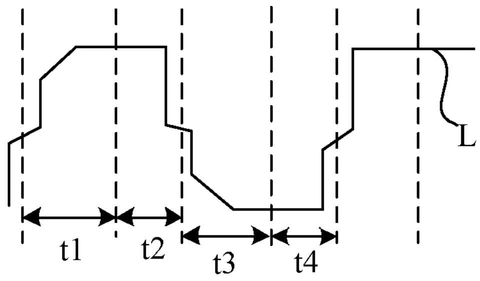
FIG. 3 is a second signal timing diagram when two adjacent pixel units sharing the same data line in the liquid crystal display panel provided by the present disclosure are charged.

Please refer to FIG. 2, it is comprehensible that, FIG. 2 is a first signal timing diagram when two adjacent pixel units sharing the same data line in the liquid crystal display panel provided by the present disclosure are charged. With reference to FIG. 1 and FIG. 2, the embodiment of the present disclosure takes the two pixel units 20 framed by the dashed line in FIG. 1 as an example for description, but it should not be construed as a limitation of the present disclosure.

As shown in FIG. 1, the first pixel unit 20 is located in the first row. The second pixel unit 20 is located in the second row. In the embodiment of the present disclosure, the scan line 11 transmits scan signals row by row from top to bottom. Therefore, the driving timing of the first pixel unit 20 is earlier than the driving timing of the second pixel unit

20. Among them, the time period t1 represents the on-duration of the scan line 11 connected to the first sub-pixel 21 in the first pixel unit 20. The time period t2 represents the on-duration of the scan line 11 connected to the second sub-pixel 22 in the first pixel unit 20. The time period t3 represents the on-duration of the scan line 11 connected to the first sub-pixel 21 in the second pixel unit 20. The time period t4 represents the on-duration of the scan line 11 connected to the second sub-pixel 22 in the second pixel unit 20. The curve L represents the change curve of the voltage value corresponding to the data voltages of the two pixel units 20 transmitted by the data line 12.

Wherein, the overlap time when the scan line 11 is turned on and the data voltage transmitted by the data line 12 reaches a set voltage value is an effective charging time for the first sub-pixel 21 or the second sub-pixel 22 to perform display. It can be understood that under ideal conditions, the data voltage can quickly reach the set voltage value. Therefore, the durations of the time periods t1-t4 are equal, that is, the duty cycles of the scan signals transmitted by the scan lines of each row are equal. And the charging rates of the first sub-pixel 21 and the second sub-pixel 22 in the two pixel units 20 are equal.

However, the liquid crystal display panel 100 of the present disclosure adopts the DLS driving method. In addition, along the first direction Y, since the polarities of the data voltages received by two adjacent pixel units 20 sharing the same data line 12 are opposite. When the data line 12 transmits the data voltage to the corresponding first sub-pixel 21, the voltage value of the data voltage changes by a large amount due to the change of the polarity of the data voltage. Different from the ideal waveform of the data voltage shown in FIG. 2, the data voltage inversion in the embodiment of the present disclosure actually requires a certain rising and falling time to reach the set voltage value. In the same pixel unit 20, the data voltages of the first sub-pixel 21 and the second sub-pixel 22 have the same polarity, so the rising or falling time of the data voltage received by the second sub-pixel 22 is small or negligible. Therefore, the charging rate of the first sub-pixel 21 with an earlier driving timing in each pixel unit 20 is slightly lower than the charging rate of the second sub-pixel 22, and a brightness bias occurs, which causes uneven display of the liquid crystal display panel 100.

In this regard, in the embodiment of the present disclosure, the duty cycle of the scan signal received by the first sub-pixel 21 is set to be greater than the duty cycle of the scan signal received by the second sub-pixel 22. The charging time of the first sub-pixel 21 can be increased, so as to increase the charging rate of the first sub-pixel 21, and in addition, the charging rate of the second sub-pixel 22 can be reduced. That is, the duration of the time period t1 is greater than the duration of the time period t2, and the duration of the time period t3 is greater than the duration of the time period t4. Thereby, the difference in the charging rate of the first sub-pixel 21 and the second sub-pixel is reduced, various stripes caused by the difference in brightness can be avoided. And hence the display quality of the liquid crystal display panel 100 is improved.

In some embodiments of the present disclosure, the duty cycle of the scan signal transmitted by each scan line 11 is adjusted according to the corresponding charging rate of the first sub-pixel 21 and the second sub-pixel 22, so that charging rates of the first sub-pixel 21 and the second sub-pixel 22 are the same.

It can be understood that, because of the different models of the liquid crystal display panel 100 or the different driving architectures, the difference in the charging rate of the first sub-pixel 21 and the second sub-pixel 22 is also different. Therefore, it is necessary to use actual measurement and other methods to set the duty cycle of the scan signal transmitted by the corresponding scan line 11 according to the actual charging rate of the first sub-pixel 21 and the second sub-pixel 22, so that the charging rate of first sub-pixel 21 and the charging rate of the second sub-pixel 22 are as equal as possible.

In the present disclosure, the duty cycles of the scan signals received by the first sub-pixel 21 and the second sub-pixel 22 in the plurality of pixel units 20 may be the same or different. Specifically, it can be set according to the amount of change in the voltage value of the data voltage received by the first sub-pixel 21 compared to the previous data voltage transmitted by the corresponding data line 12.

It can be understood that the larger the voltage difference between the current data voltage and the previous data voltage transmitted by the data line 12, the longer rising time or falling time is actually required for the data voltage inversion, which leads to lower charging rate of the first sub-pixel 21. Therefore, adjusting the duty cycle of the corresponding scan signal according to the voltage difference between the data voltage received by the first sub-pixel 21 and the previous data voltage transmitted by the corresponding data line 12 can effectively reduce the difference of charging rate of the first sub-pixel 21 and the second sub-pixel 22.

Further, in some embodiments of the present disclosure, in the plurality of pixel units 20, the ratios of the duty cycle of the scan signal received by the first sub-pixel 21 to the duty cycle of the scan signal received by the second sub-pixel 22 are the same. For example, when the data voltage received by the plurality of first sub-pixels 21 is within a set range compared with the voltage value of the previous data voltage transmitted by the corresponding data line 12, the ratios of the duty cycles of the scan signals with respect to the plurality of pixel units 20 can be set to the same, thereby reducing the complexity of the driving timing.

Further, in each pixel unit 20, the ratios of the duty cycle of the scan signal received by the first sub-pixel 21 to the duty cycle of the scan signal received by the second sub-pixel 22 are the same. For example, in a specific embodiment, the ratios of the duty cycle of the scan signal received by the first sub-pixel 21 to the duty cycle of the scan signal received by the second sub-pixel 22 are 3:2.

In the embodiment of the present disclosure, by setting the duty cycle of the scan signal received by the first sub-pixel 21 and the duty cycle of the scan signal received by the second sub-pixel 22 to a fixed value, the charging rates of the first sub-pixel 21 and the second sub-pixel 22 can be improved. In addition, the complexity of the driving timing can be further reduced.

In some embodiments of the present disclosure, the data line 12 is also configured to transmit a common voltage to each of the first sub-pixels 21 before transmitting the data voltage to each of the first sub-pixels 21. It can be seen from the analysis of the foregoing embodiment that the polarity of the data voltage received by the first sub-pixel 21 is opposite to the polarity of the previous data voltage transmitted by the corresponding data line 12, so it takes a certain time for the data voltage to invert to a set voltage value. In the embodiment of the present disclosure, the data line 12 transmits a common voltage to each of the first sub-pixels 21 before transmitting the data voltage to each of the first sub-pixels 21. The difference between the common voltage and the set voltage required by the first sub-pixel 21 is smaller, which is equivalent to pre-charging the first sub-pixel 21. As a result, when the corresponding scan line 11 is turned on, the charging rate of the first sub-pixel 21 can be effectively increased.

In the existing solution, not only the common voltage is transmitted to each of the first sub-pixels 21 before the data voltage is transmitted to each of the first sub-pixels 21. It is also necessary to transmit the common voltage to each of the second sub-pixels 22 before the data voltage is transmitted to each of the second sub-pixels 22. This solution will increase the power consumption of the source driver chip due to too many jumps of the data voltage and cause the temperature to rise significantly. Although the problem of the difference in charging rate is improved, the overall charging rate is reduced. In the embodiment of the present disclosure, by setting the duty cycle of the scan signal received by the first sub-pixel 21 to be greater than the duty cycle of the scan signal received by the second sub-pixel 22, the difference in the charging rate has been improved to a certain extent. Therefore, it is only necessary to transmit the common voltage to each of the first sub-pixels 21 for pre-charging before transmitting the data voltage to each of the first sub-pixels 21. Thereby reducing the number of data voltage jumps, reducing power consumption, and increasing the overall charging rate.

Please continue to refer to FIG. 1. In the embodiment of the present disclosure, in each row of pixel units 20, the polarities of the data voltages connected to adjacent pixel units 20 are opposite, and the polarities of the data voltages connected to each column of pixel units 20 are the same.

Wherein, two scan lines 11 are provided between each of two adjacent rows of pixel units 20. In each pixel unit 20, the first sub-pixel 21 and the second sub-pixel 22 are both electrically connected to the data line 12 located on the left side of the corresponding column pixel unit 20. The first sub-pixel 21 and the second sub-pixel 22 are respectively electrically connected to two scan lines 11 located on the upper and lower sides of the corresponding row pixel unit 20. Among them, the first sub-pixel 21 is connected to the scan line 11 located above the corresponding row pixel unit 20. The second sub-pixel 22 is connected to the scan line 11 located below the corresponding row pixel unit 20.

In the embodiment of the present disclosure, along the second direction X, a 2-dot inversion driving method is adopted. Along the first direction Y, the polarities of the data voltages connected to each pixel unit 20 are the same. The connection modes of the first sub-pixel 21 and the second sub-pixel 22 to the scan line 11 and the data line 12 are relatively flexible. It only needs to satisfy that the polarities of the data voltages received by two adjacent pixel units 20 sharing the same data line 12 are opposite, and in each pixel unit 20, the driving timing of the first sub-pixel 21 is earlier than the driving timing of the second sub-pixel 22.

Figure 4:
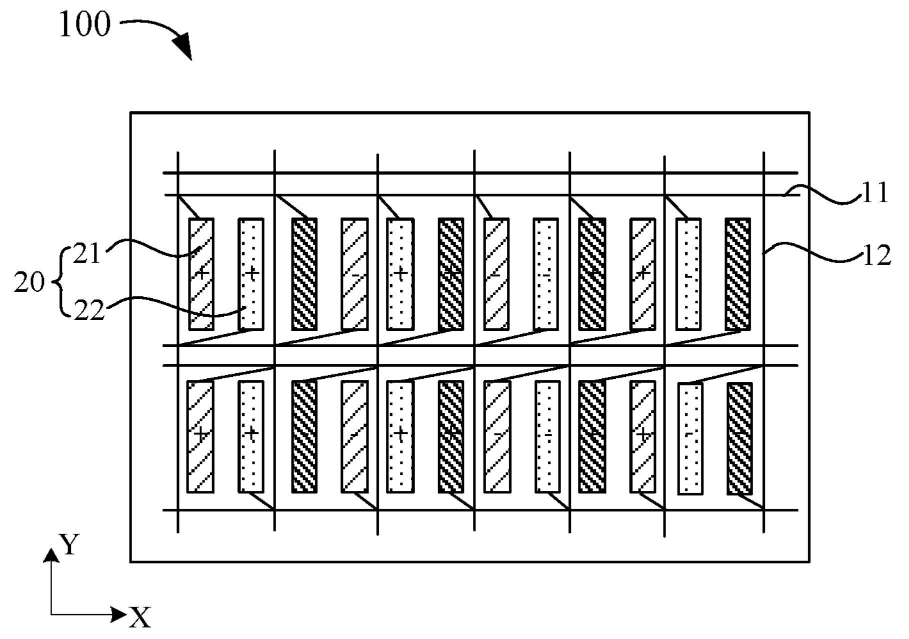
FIG. 4 is a schematic diagram of a second structure of the liquid crystal display panel provided by the present disclosure.

Please refer to FIG. 4, which is a schematic diagram of a second structure of the liquid crystal display panel provided by the present disclosure. The difference from the liquid crystal display panel 100 shown in FIG. 1 is that, in this embodiment, in each pixel unit 20, the first sub-pixel 21 is located in the first column, and the second sub-pixel 22 is located in the second column. The first sub-pixel 21 is electrically connected to the scan line 11 located above the pixel unit 20, and the second sub-pixel 22 is electrically connected to the scan line 11 located below the pixel unit 20.

In the embodiment of the present disclosure, the positions of the first sub-pixel 21 and the second sub-pixel 22 are confined, so that the connection of the first sub-pixel 21 and the second sub-pixel 22 to the scan line 11 and the data line 12 is more regular, which improves the wiring regularity of the liquid crystal display panel 100 and reduces the wiring complexity.

Figure 5:
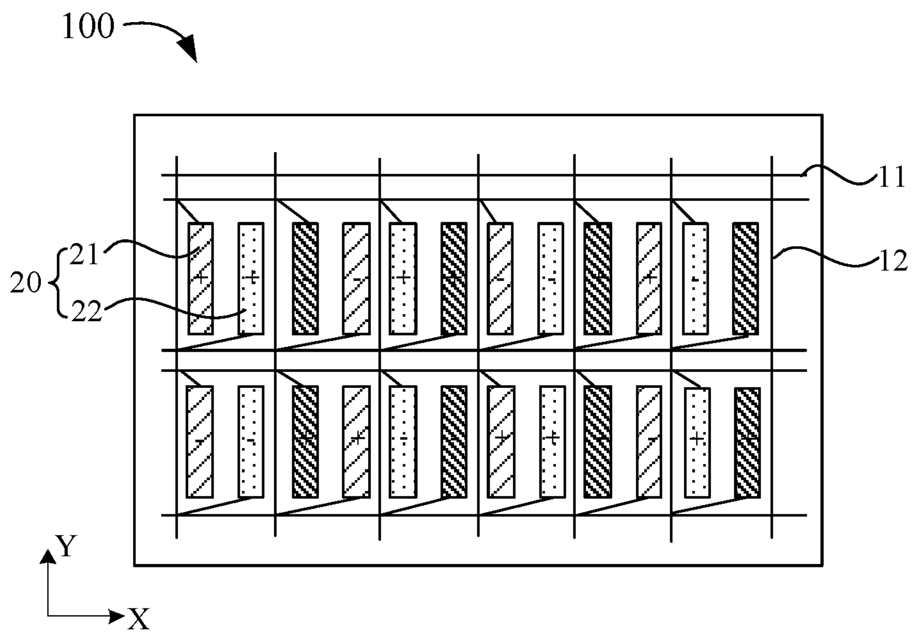
FIG. 5 is a schematic diagram of a third structure of the liquid crystal display panel provided by the present disclosure.

Please refer to FIG. 5. FIG. 5 is a third structural diagram of the liquid crystal display panel provided by the present disclosure. The difference from the liquid crystal display panel 100 shown in FIG. 1 is that, in this embodiment, in each row of pixel units 20, the polarities of the data voltages connected to the adjacent pixel units 20 are opposite, and in each column of pixel units 20, the polarities of the data voltages connected to adjacent pixel units 20 are opposite. Therefore, each column of pixel units 20 can be electrically connected to the same data line 11.

This embodiment further reduces the wiring complexity of the liquid crystal display panel 100. In addition, along the second direction X, the liquid crystal display panel 100 adopts a 2-dot inversion driving method, and along the first direction Y, a 1-dot inversion driving method is adopted, which can further improve the quality of the display picture.

In the embodiment of the present disclosure, both the first sub-pixel 21 and the second sub-pixel 22 may be red sub-pixels, green sub-pixels, blue sub-pixels, white sub-pixels, yellow sub-pixels, etc., which are not specifically limited in this application. The display panel 100 provided in the present disclosure may adopt a standard RGB pixel arrangement structure, an RGB PenTile pixel arrangement structure, an RGB Delta pixel arrangement structure, an RGBW pixel arrangement structure, etc., which can be specifically set according to the display requirements of the liquid crystal display panel 100.

For example, in some embodiments of the present disclosure, the first sub-pixel 21 and the second sub-pixel 22 are red sub-pixels, green sub-pixels, or blue sub-pixels. In the same row of pixel units 20, a plurality of first sub-pixels 21 and second sub-pixels 22 are repeatedly arranged in any one of RGB, RBG, BGR, BRG, GRB, GBR permutations and combinations. The colors of the first sub-pixel 21 or the second sub-pixel 22 located in the same column are the same.

For another example, in other embodiments of the present disclosure, the first sub-pixel 21 and the second sub-pixel 22 are red sub-pixels, green sub-pixels, blue sub-pixels, or white sub-pixels. In the same row of pixel units 20, a plurality of first sub-pixels 21 and second sub-pixels 22 are repeatedly arranged in any one of RGBW, RBGW, BGRW, BRGW, GRBW, GBRW and other permutations and combinations. The colors of the first sub-pixel 21 or the second sub-pixel 22 located in the same column are the same.

Among them, the RGB pixel arrangement structure has a simple structure and a mature production process. When applied in this application, the production process can be simplified, and the production cost can be reduced. The white sub-pixels are added to the RGBW pixel arrangement structure, so that the light transmittance of the liquid crystal display panel 100 is significantly improved. The brightness of the liquid crystal display panel 100 is also improved on the basis of the traditional RGB pixel arrangement structure.

Correspondingly, the present disclosure also provides a display device, which includes a liquid crystal display panel, a source driving chip, and a gate driving circuit. The source driver chip is used to provide data voltages to the liquid crystal display panel. The gate driving circuit is used to provide scan signals to the liquid crystal display panel. The liquid crystal display panel is the liquid crystal display panel described in any of the above-mentioned embodiments. For details, please refer to the above-mentioned content, which will not be repeated here.

In addition, the display device may be a smart phone, a tablet computer, an e-book reader, a smart watch, a video camera, a game console, etc., which is not limited in this application.

Figure 6:
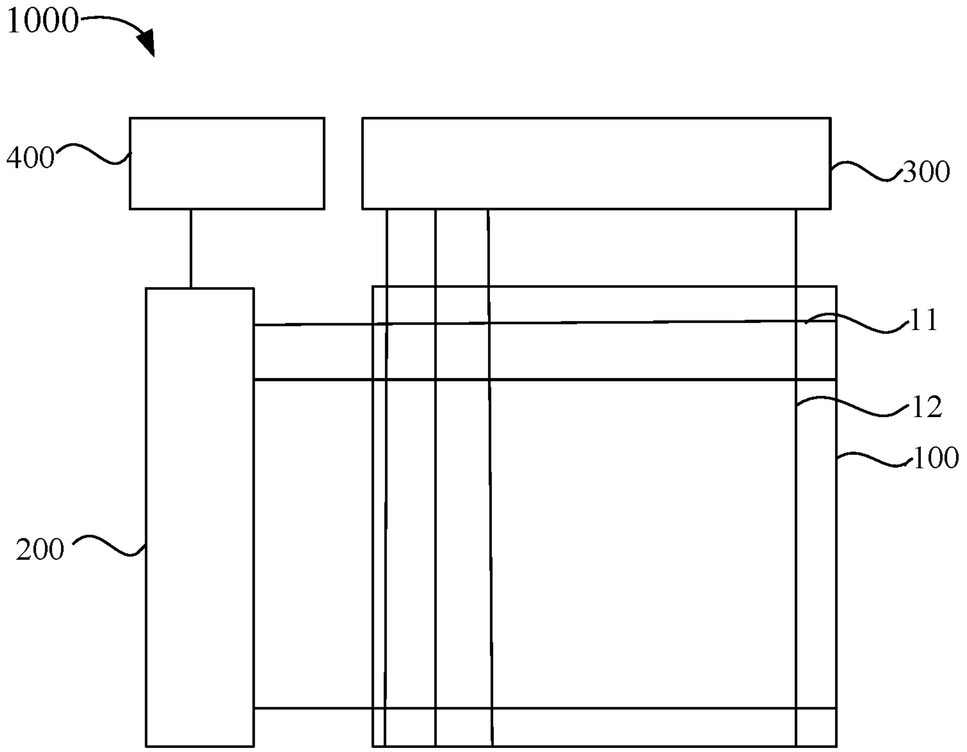
FIG. 6 is a schematic diagram of the display device provided by the present disclosure.

Specifically, please refer to FIG. 6, which is a schematic structural diagram of the display device provided by the present disclosure. The display device 1000 includes a liquid crystal display panel 100, a gate driving circuit 200, a source driving chip 300, and a timing controller 400.

Wherein, the liquid crystal display panel 100 includes a plurality of scan lines 11 and a plurality of data lines 12. A plurality of scan lines 11 are arranged along the first direction Y. The multiple data lines 12 are arranged along the second direction X. The liquid crystal display panel 100 further includes a plurality of sub-pixels (not labeled in the figure), and each sub-pixel is electrically connected to a corresponding scan line 11 and to a corresponding data line 12.

The timing controller 400 may generate a scan control signal for controlling the gate driving circuit 200 and a data control signal for controlling the source driving chip 300 in response to a control signal received from the outside. For example, the control signal may include a dot clock, a data enabled signal, a vertical synchronization signal, and a horizontal synchronization signal. The timing controller 400 may supply a scan control signal to the gate driving circuit 200 and may supply a data control signal to the source driving chip 300.

The gate driving circuit 200 transmits scan signals to the liquid crystal display panel 100 through the scan lines 11. In some embodiments, the gate driving circuit 200 may be an independently provided gate chip. In other embodiments, the gate driving circuit 200 may be a GOA (gate driving technology for array substrate) provided in the display panel 100, which is not specifically limited in this application.

The source driver chip 300 transmits data signals to the liquid crystal display panel 100 through the data lines 12. In some embodiments, the source driver chip 300 may be bound on the liquid crystal display panel 100 through COF (Chip on Film), which is not specifically limited in this application.

The application provides a display device 1000. The display device 1000 includes a liquid crystal display panel 100. In the liquid crystal display panel 100, the polarities of the data voltages received by two adjacent pixel units sharing the same data line 12 are opposite. In each pixel unit, the driving timing of the first sub-pixel is earlier than the driving timing of the second sub-pixel. In the present disclosure, by setting the duty cycle of the scanning signal received by the first sub-pixel to be greater than the duty cycle of the scanning signal received by the second sub-pixel, the difference in the charging rate between the first sub-pixel and the second sub-pixel can be reduced, and the various stripes generated by the difference in brightness can be avoided, thereby improving the display quality of the display device 1000.

The liquid crystal display panel and the display device provided by the present disclosure are described in detail above, and specific examples are used to describe the principles and implementations of the present disclosure. The description of the above embodiments is only used to help understand the methodology and the core idea of the present disclosure. In addition, for those of ordinary skill in the art, according to the idea of this application, there will be variations of the specific implementations and different scopes of applications. In summary, the contents of this specification should not be construed as a limitation to this application.

What is claimed is:

1. A device of liquid crystal display panel, comprising:

a plurality of scan lines arranged along a first direction, configured to transmit scan signals;

a plurality of data lines arranged along a second direction, configured to transmit data voltages with different polarities; and a plurality of pixel units arranged in an array, each of the pixel units comprising a first sub-pixel and a second sub-pixel sharing a data line electrically connected to two adjacent scan lines respectively;

wherein in the first direction, polarities of data voltages received by the two adjacent pixel units sharing the same data line are opposite, and in each of the pixel units; a driving timing of the first sub-pixel is earlier than a driving timing of the second sub-pixel, and the duty cycle of the scan signal received by the first sub-pixel is greater than the duty cycle of the scan signal received by the second sub-pixel.

2. The device of liquid crystal display panel in claim 1, wherein the duty cycle of the scan signal is adjusted based on the voltage difference between the data voltage received by the corresponding first sub-pixel and the previous data voltage transmitted by the corresponding data line.

3. The device of liquid crystal display panel in claim 1, wherein in the plurality of rows of the pixel units, ratios of the duty cycle of the scan signal received by the first sub-pixel to the duty cycle of the scan signal received by the second sub-pixel are the same.

4. The device of liquid crystal display panel in claim 1, wherein the data line is further configured to transmit a common voltage to each of the first sub-pixels before transmitting the data voltage to each of the first sub-pixels.

5. The device of liquid crystal display panel in claim 1, wherein in each row of the pixel units, the polarities of the data voltages connected to the adjacent pixel units are opposite, and the polarities of the data voltages connected to the plurality of the pixel units located in the same column are the same.

6. The device of liquid crystal display panel in claim 5, wherein two scan lines are provided between two adjacent rows of the pixel units, and in each of the pixel units, the first sub-pixel is located in the first column and the second sub-pixel is located in the second column, and the first sub-pixel is electrically connected to the scan line located above the pixel unit and the second sub-pixel is electrically connected to the scan line located below the pixel unit.

7. The device of liquid crystal display panel in claim 5, wherein in the two adjacent rows of the pixel units, in one row of the pixel units, the first sub-pixel and the second sub-pixel are both electrically connected to the data line located on the left side and adjacent to the pixel unit, and in the other row of the pixel unit, the first sub-pixel and the second sub-pixel are both electrically connected to the data line located on the right side and adjacent to the pixel unit.

8. The device of liquid crystal display panel in claim 1, wherein in each row of the pixel units, the polarities of the data voltages connected to the adjacent pixel units are opposite, and in each column of the pixel units, the polarities of the data voltages connected to the adjacent pixel units are opposite.

9. The device of liquid crystal display panel in claim 1, wherein the first sub-pixel and the second sub-pixel are red sub-pixels, green sub-pixels, or blue sub-pixels, and in the pixel units of the same row, the red sub-pixels, the green sub-pixels, and the blue sub-pixels are repeatedly arranged in any permutations and combinations, and the colors of the first sub-pixels or the second sub-pixels located in the same column are the same.

10. The device of liquid crystal display panel in claim 1, wherein the first sub-pixel and the second sub-pixel are red sub-pixels, green sub-pixels, blue sub-pixels, or white sub-pixels, and in the pixel units of the same row, the red sub-pixels, the green sub-pixels, the blue sub-pixels, and the white sub-pixels are repeatedly arranged in any permutations and combinations, and the colors of the first sub-pixel or the second sub-pixel located in the same column are the same.

11. A display device comprising:

a source drive chip providing data voltages;

a gate drive circuit providing scan signals; and a liquid crystal display panel, comprising:

a plurality of scan lines arranged along a first direction, configured to transmit the scan signals;

a plurality of data lines arranged along a second direction, configured to transmit the data voltages with different polarities; and a plurality of pixel units arranged in an array, each of the pixel units comprising a first sub-pixel and a second sub-pixel sharing a data line electrically connected to two adjacent scan lines respectively;

wherein in the first direction, polarities of data voltages received by the two adjacent pixel units sharing the same data line are opposite, and in each of the pixel units; a driving timing of the first sub-pixel is earlier than a driving timing of the second sub-pixel, and the duty cycle of the scan signal received by the first sub-pixel is greater than the duty cycle of the scan signal received by the second sub-pixel.

12. The display device of claim 11, wherein the duty cycle of the scan signal is adjusted based on the voltage difference between the data voltage received by the corresponding first sub-pixel and the previous data voltage transmitted by the corresponding data line.

13. The display device of claim 11, wherein in the plurality of rows of the pixel units, the ratios of the duty cycle of the scan signal received by the first sub-pixel to the duty cycle of the scan signal received by the second sub-pixel are the same.

14. The display device of claim 11, wherein the data line is further configured to transmit a common voltage to each of the first sub-pixels before transmitting the data voltage to each of the first sub-pixels.

15. The display device of claim 11, wherein in each row of the pixel units, the polarities of the data voltages connected to the adjacent pixel units are opposite, and the polarities of the data voltages connected to the plurality of the pixel units located in the same column are the same.

16. The display device of claim 15, wherein two scan lines are provided between two adjacent rows of pixel units, and in each of the pixel units, the first sub-pixel is located in the first column and the second sub-pixel is located in the second column, and the first sub-pixel is electrically connected to the scan line located above the pixel unit and the second sub-pixel is electrically connected to the scan line located below the pixel unit.

17. The display device of claim 15, wherein in the two adjacent rows of the pixel units, in one row of the pixel units, the first sub-pixel and the second sub-pixel are both electrically connected to the data line located on the left side and adjacent to the pixel unit, and in the other row of the pixel unit, the first sub-pixel and the second sub-pixel are both electrically connected to the data line located on the right side and adjacent to the pixel unit.

18. The display device of claim 11, wherein in each row of the pixel units, the polarities of the data voltages connected to the adjacent pixel units are opposite, and in each column of the pixel units, the polarities of the data voltages connected to the adjacent pixel units are opposite.

19. The display device of claim 11, wherein the first sub-pixel and the second sub-pixel are red sub-pixels, green sub-pixels, or blue sub-pixels, and in the pixel units of the same row, the red sub-pixels, the green sub-pixels, and the blue sub-pixels are repeatedly arranged in any permutations and combinations, and the colors of the first sub-pixels or the second sub-pixels located in the same column are the same.

20. The display device of claim 11, wherein the first sub-pixel and the second sub-pixel are red sub-pixels, green sub-pixels, blue sub-pixels or white sub-pixels, and in the pixel units of the same row, the red sub-pixels, the green sub-pixels, the blue sub-pixels, and the white sub-pixels are repeatedly arranged in any permutations and combinations, and the colors of the first sub-pixel or the second sub-pixel located in the same column are the same.

* * * * *